United States Patent
Reddy et al.

(10) Patent No.: US 11,404,986 B2
(45) Date of Patent: Aug. 2, 2022

(54) TORQUE CONTROL BASED ON ROTOR RESISTANCE MODELING IN INDUCTION MOTORS

(71) Applicant: Caterpillar Inc., Peoria, IL (US)

(72) Inventors: Suresh Baddam Reddy, Peoria, IL (US); Alexander C. Crosman, III, Dunlap, IL (US); Thomas Michael Sopko, Jr., East Peoria, IL (US); Carlos Eduardo Nino Baron, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 141 days.

(21) Appl. No.: 16/993,844

(22) Filed: Aug. 14, 2020

(65) Prior Publication Data

US 2022/0052633 A1    Feb. 17, 2022

(51) Int. Cl.
    *H02P 1/34*         (2006.01)
    *H02P 1/42*         (2006.01)
    *H02P 3/18*         (2006.01)
    *H02P 23/14*       (2006.01)
    *H02P 29/64*       (2016.01)
    *H02P 23/00*       (2016.01)

(52) U.S. Cl.
    CPC .......... *H02P 23/14* (2013.01); *H02P 23/0022* (2013.01); *H02P 29/64* (2016.02); *H02P 2207/01* (2013.01)

(58) Field of Classification Search
    CPC ....... H02P 23/14; H02P 29/64; H02P 23/0022
    USPC ........................................................ 318/821
    See application file for complete search history.

(56) References Cited

U.S. PATENT DOCUMENTS

| | | | |
|---|---|---|---|
| 4,672,288 A | 6/1987 | Abbondanti | |
| 5,977,742 A | 11/1999 | Henmi | |
| 6,900,607 B2* | 5/2005 | Kleinau | ................. H02P 23/14 374/E7.027 |
| 7,560,895 B2 | 7/2009 | Arnet | |
| 7,576,506 B2* | 8/2009 | Kleinau | ............... B60L 15/025 318/473 |
| 2005/0062450 A1 | 3/2005 | Pace | |

(Continued)

FOREIGN PATENT DOCUMENTS

WO     WO2018103581     6/2018

*Primary Examiner* — Erick D Glass
(74) *Attorney, Agent, or Firm* — Lee & Hayes, PLLC

(57) ABSTRACT

A control system for an induction motor executes an on-board, dynamic model to estimate rotor resistance and control the torque output by the induction motor. The model includes equations to calculate stator and rotor temperatures and/or resistances based on combinations of voltage and current data, electrical frequency, rotor speed, switching patterns, and air flow rates during operation of the induction motor. The control system updates the model based on feedback collected during the operation of the induction motor, including the difference between the actual observed stator temperature and the stator temperature predicted by the model. The model is updated to converge the predicted stator temperature on the actual observed stator temperature, and corresponding updates are made to the rotor resistance estimations to provide more accurate estimations of the rotor resistance and improve the accuracy of the induction motor torque output.

20 Claims, 6 Drawing Sheets

(56) References Cited

U.S. PATENT DOCUMENTS

2005/0067692 A1\* 3/2005 Ramanathan .......... H01L 23/38
  438/455
2020/0341062 A1\* 10/2020 Wang .................... G01N 25/72

\* cited by examiner

TORQUE CONTROL BASED ON ROTOR RESISTANCE MODELING IN INDUCTION MOTORS

TECHNICAL FIELD

This disclosure relates generally to techniques and systems for monitoring and controlling induction motors and, more specifically, for building and executing dynamic onboard models that use thermal observations to estimate the rotor resistance and control the torque output of an induction motor.

BACKGROUND

Induction motors are used in motor driven machines in various industrial and commercial settings. Industrial machines such as construction equipment, mining trucks, locomotives, fracturing pumps, and other industrial equipment often use induction motor drive systems. Although different induction motors use various different designs, induction motors generally include a stationary stator component, and a rotor component that is rotatable relative to the stator component. When an alternating current (hereinafter "AC") power source supplies current to the stator component, poles and windings of the stator induce a magnetic field that causes the rotor to rotate about a central axis of the rotor, thereby driving the motor.

The torque output of such an induction motor is directly proportional to the rotor resistance. Accordingly, a control system of the induction motor can manipulate the currents to the rotor and frequency to achieve the desired torque output from the motor. However, achieving a desired torque output with a high level of accuracy requires an accurate estimation of the rotor resistance during operation of the motor. Performing accurate estimations of the rotor resistance during the operation of the induction motor in a production environment presents significant challenges. For example, although rotor resistance varies based on rotor temperature, many induction motor control systems do not directly measure rotor resistance or rotor temperature during operation of the motor. In some conventional systems, the stator temperature is measured during operation of the motor, and the current stator temperature is used to estimate the rotor resistance. However, the rotor resistance calculations in such systems are often inaccurate because they rely on the false assumption that the stator and rotor components have the same thermal dynamic properties, and will heat up and cool down at the same rate during operation. To the contrary, stators and rotors within induction motors often have different thermal dynamics, and heat and cool at different rates during operation. Additionally, iron and copper loss magnitudes in the rotor and stator are different, as are dimensions and materials (and thus the thermal masses and thermal resistances) in the rotor and stator. Thus, rotor resistance estimations based solely on the stator temperature measurements are often inaccurate, leading to less accuracy in the amount of torque output by the motor. Various other conventional techniques include using modeling and simulation to predict rotor resistance, as well as mapping rotor temperatures manually during lab testing to estimate rotor resistances. However, these conventional techniques are not only time consuming, but also fail to consider small motor-to-motor differences or defects, wear, and installation or environmental differences between the test motors operating in a controlled lab environment and production equipment operating in real-world environments.

For example, U.S. Patent Appl. Publ. No. 2005/0062450 ("the '450 application") describes a system for estimating rotor resistance in an induction motor based on a calibrated measurement of the stator temperature. The system described in the '450 application monitors the temperature of the stator winding and uses the temperature signal to look up a corresponding value for rotor resistance in a calibrated "look up" table. The values of the look up table used by the '450 application are determined during a testing process in which the actual (measured) motor torque is controlled. However, the system described in the '450 application is based on lab testing processes in controlled environments, and thus fails to take into account small motor-to-motor production differences, motor wear, and other installation and environmental differences that effect the thermal dynamics of individual motors.

Example embodiments of the present disclosure are directed toward overcoming the deficiencies described above.

SUMMARY

In an example of the present disclosure, a control system for an induction motor includes a plurality of sensors connectable to the induction motor, the plurality of sensors including a stator temperature sensor and one or more additional sensors, one or more central processing units (CPUs) in communication with the plurality of sensors, and memory storing executable instructions that, when executed by the one or more CPUs, cause the control system to perform operations comprising receiving sensor data from the one or more additional sensors during operation of the induction motor, determining a predicted temperature of a stator of the induction motor based at least in part on the sensor data from the one or more additional sensors, receiving an observed temperature of the stator from the stator temperature sensor, determining a difference between the predicted temperature and the observed temperature of the stator, determining a resistance of a rotor of the induction motor based at least in part on the difference between the predicted temperature and the observed temperature of the stator, and controlling a torque output the induction motor based at least in part on the resistance of the rotor.

In another example of the present disclosure, a method comprises receiving, by a controller associated with an induction motor, sensor data from one or more sensors during operation of the induction motor, determining, by the controller, a predicted temperature of a stator of the induction motor based at least in part on the sensor data from the one or more sensors, receiving, by the controller, an observed temperature of the stator from a stator temperature sensor, determining, by the controller, a difference between the predicted temperature and the observed temperature of the stator, determining, by the controller, a resistance of a rotor of the induction motor based at least in part on the difference between the predicted temperature and the observed temperature of the stator, and controlling, by the controller, a torque output of the induction motor based at least in part on the resistance of the rotor.

In yet another example of the present disclosure, a system comprises an induction motor including a stator component, a rotor component, a drive shaft coupled to the rotor component, and an AC power source, a first sensor configured to determine a temperature of the stator component, a second sensor configured to determine at least one additional operating parameter of the induction motor, and a controller operably connected to the induction motor, and in communication with the first sensor and the second sensor, the controller being configured to receive sensor data from the second sensor during operation of the induction motor, determine a predicted temperature of the stator component based at least in part on the sensor data from the second sensor, receive an observed temperature of the stator component from the first sensor, determine a difference between the predicted temperature of the stator component and the observed temperature of the stator component, determine a resistance of the rotor component based at least in part on the difference between the predicted temperature of the stator component and the observed temperature of the stator component, and control a torque output the induction motor based at least in part on the resistance of the rotor component.

DETAILED DESCRIPTION

Figure 1:
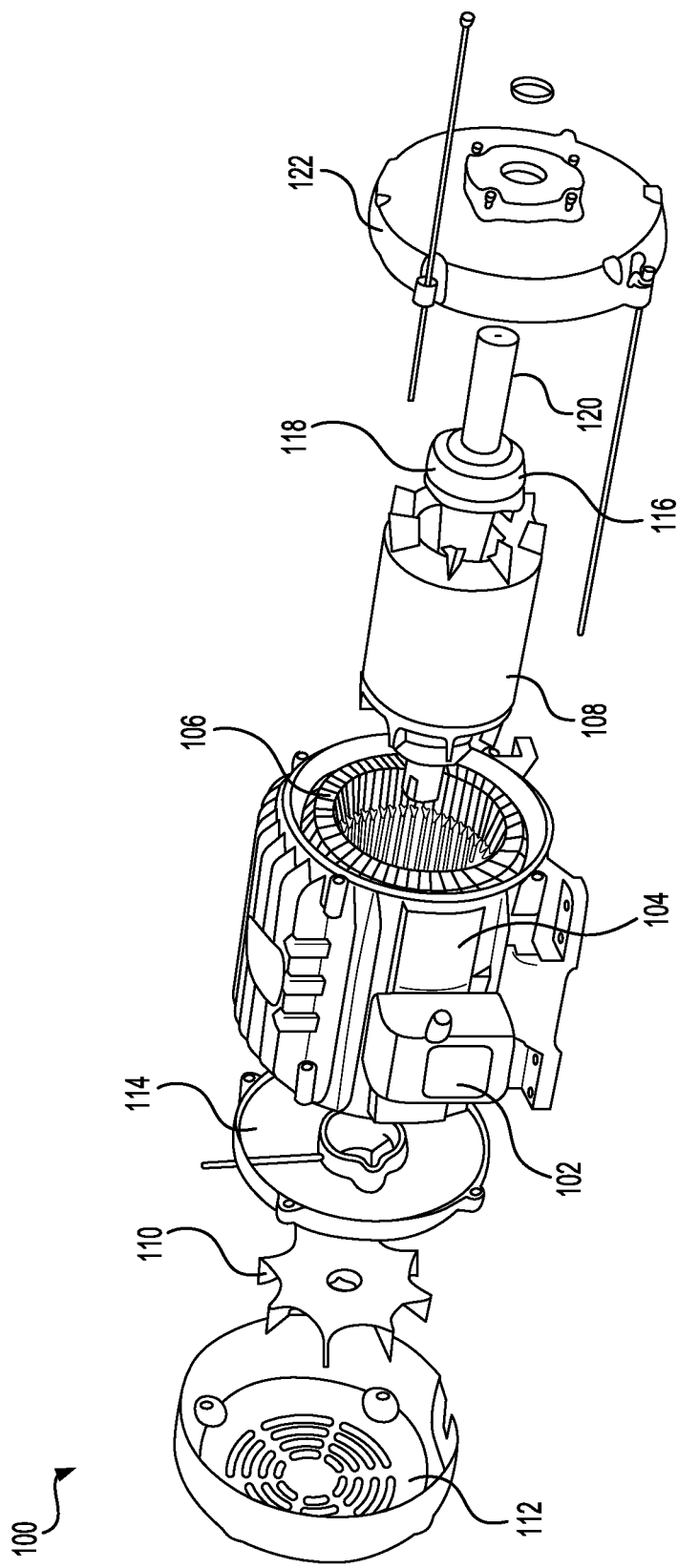
FIG. 1 illustrates an example induction motor configured to estimate rotor resistance and control torque output, in accordance with one or more examples of the present disclosure.

FIG. 1 illustrates an example induction motor 100 of the present disclosure. As described below, the techniques and systems described herein relate to building and executing dynamic models to estimate rotor resistance during operation of the induction motor 100, and controlling the induction motor 100 based on the estimated rotor resistance to achieve greater torque accuracy. In some examples, a controller 102 within the induction motor 100 stores and executes a model that includes equations for estimating temperature and/or resistance of a stator 104 and a rotor 108 based on various data collected during the operation of the induction motor 100. In various implementations of the model, the equations for estimating temperature and resistance for the stator 104 and rotor 108 are based on combinations of voltage and current data, electrical frequency, rotor speed, switching patterns, and air flow rates collected during the operation of the induction motor 100. Further techniques described herein include the controller 102 updating the model dynamically based on feedback collected during the operation of the induction motor 100, such as sensor data, motor control/operational data, thermal network data, etc. In some instances, the controller 102 updates the equations used by the model for estimating temperature and resistance and of the stator 104 and rotor 108, by calculating the difference between the stator temperature predicted by the model and the actual stator temperature observed using temperature sensors on the induction motor 100. For instance, the controller 102 updates the equation for estimating stator temperature to converge with the actual observed stator temperature, and performs corresponding updates to the equation(s) for estimating rotor temperature and/or rotor resistance, thereby providing a more accurate rotor resistance estimation that updates dynamically based on the feedback collected during the operation of the induction motor 100.

In this example, the induction motor 100 includes a stator 104 with an iron frame, and windings 106 of copper coils within the iron frame of the stator 104. When a power source operably connected to the induction motor 100 supplies a current to the windings 106, this current induces a rotating magnetic field to the area inside the stator 104. The combination of the rotating magnetic field within the stator 104 and the structure and composition of the rotor 108 causes the rotor 108 to rotate within the stator 104. For example, the rotating magnetic field induces currents in the rotor 108, which produces torque on the rotor 108 through the interaction of the rotor currents and the rotating magnetic field. In some examples, the rotor 108 is a squirrel-cage rotor built as a cylinder of steel laminations with a highly conductive material (e.g., copper or aluminum) embedded into the surface of the rotor 108. The magnetic field produced by the windings 106 causes the rotor 108 to spin inside the stator 104, with the assistance of a ball bearing 116 and a bearing seal 118. The spinning of the rotor 108 drives the rotation of a drive shaft 120 connected to the rotor 108. The drive shaft 120 protrudes through a drive end bell 122 connected to the frame of the induction motor 100. In some examples, the drive shaft 120 is connected to one or more gears, shafts, couplings, gearboxes, or other components of a machine (e.g., vehicle engine, pump, electric locomotive, etc.) such that rotation of the drive shaft 120 drives the various machine components to which it is connected. In this example, the induction motor 100 also includes a cooling fan 110, a fan cover 112, and a non-drive end bell 114. The controller 102 (or control system) includes one or more CPUs and/or circuit board(s) and wiring for controlling the speed and torque output as well as various other components of the induction motor 100 (e.g., the cooling fan). Although certain examples are discussed with reference to the induction motor 100 shown in FIG. 1, it should be understood that induction motor 100 is illustrative only and that the techniques and systems described herein are applicable to other types of induction motors having various different designs that include a stator, rotor, and an internal or external control system.

In some examples, the machine in which the induction motor 100 operates receives motor control commands (e.g., speed or torque commands) from a driver or operator of the machine. The drivers and/or operators issuing motor control commands include both human drivers/operators and software-based operators in the case of autonomous or semi-autonomous machines. The motor control commands are received as data signals by the controller 102, and the controller 102 processes the data signals and implements the desired motor speed and/or torque by applying voltages and currents to the corresponding components of the induction motor 100. For example, in some cases the induction motor 100 includes a variable frequency AC drive and speed is controlled based on the applied line frequency minus an amount of slip proportional to the load. Additionally or alternatively, the controller 102 controls the torque output of the induction motor 100 using one or more control algorithms such as direct torque control (DTC), DTC-Space Vector Modulation (DTC-SVM), Model Predictive Control (MPC), and/or various other torque control strategies. In some cases, the controller 102 uses one or more of these algorithms to manipulates the electrical resistance of the rotor 108 to achieve the desired torque. For instance, the controller 102 adds rotor resistance during a start-up phase of the induction motor 100 to achieve a higher staring torque, and then reduces the rotor resistance so achieve greater efficiency of the induction motor 100 after the start-up phase.

In some examples, the controlling of both the speed and/or the torque by the controller 102 include receiving feedback data from the various components of the induction motor 100 during operation. In some instances, the controller 102 implements speed control techniques including a feedback loop that measures the rotating frequency of the drive shaft 120 and adjusts the drive frequency to maintain the desired motor speed. Additional or alternatively, the controller 102 implements torque control techniques based on feedforward and feedback voltage calculations. In these examples, the controller 102 controls the currents and/or voltages output to the motor components in response to feedback data received during the operation of the induction motor 100, to achieve the desired speed and torque for the induction motor 100.

Further, as noted above the techniques described herein include building and executing models with equations for calculating stator temperatures, rotor temperatures, stator resistances, and rotor resistances. In an example, model-based equations for estimating or predicting the temperature of the stator 104 during operation and the resistance of the rotor 108 during operation are shown below as Equation 1 and Equation 2.

$$\frac{d}{dt}(T_s) = f_s(T_s, R_r, V_{dc}, V_m, I_m, W_r, ws, swp, af) \quad \text{Equation 1}$$

$$\frac{d}{dt}(R_r) = f_r(T_s, R_r, V_{dc}, V_m, I_m, W_r, ws, swp, af) \quad \text{Equation 2}$$

In this example, Equation 1 represents a generalized equation for estimating the stator temperature ($T_s$), and Equation 2 represents a generalized equation for estimating the rotor resistance ($R_r$). In these equations, d/dt is the derivative operator, $T_s$ represents the stator temperature, $R_r$ represents the rotor resistance, $V_{dc}$ represents DC link voltage, $V_m$ represents the motor AC RMS line-to-line voltage, $I_m$ represents the RMS phase current, $W_r$ represents the rotor speed, ws represents the electrical frequency of the induction motor 100, swp represents the switching patterns map of the induction motor 100, and af represents the air flow rate within the induction motor 100. In this example, the AC RMS line-to-line voltage value refers to the square root of the mean (or average) value of the squared function of the instantaneous values. Because an AC voltage rises and falls with time, it takes more AC voltage to produce a given RMS voltage than it would for DC.

As shown in the above equations, in this example both the stator temperature and the rotor resistance are functions of the DC link voltage, the motor AC RMS line-to-line voltage, the RMS phase current, the rotor speed, the electrical frequency, the switching patterns map, and the air flow rate within the induction motor 100. However, while the stator temperature and the rotor resistance are based on the same dependent variables in this example, they need not be equal or proportional values given that the stator 104 and rotor 108 have different thermal dynamics and thermal time constants which cause them to heat up and cool down at different rates during operation.

When executing the various equations for calculating stator temperature (e.g., Equation 1), rotor resistance (e.g., Equation 2), and/or any model equations described herein, the controller 102 receives sensor data and/or electrical feedback data from various components of the induction motor 100. Although not explicitly shown in FIG. 1, controller 102 receives motor command control signals from a driver/operator that from the machine driver/operator that indicate the desired motor functions (e.g., motor speed, torque, cooling fan speed, etc.) and/or the desired general machine functions (e.g., machine speed for an engine, pump speed for a pump, etc.). In various examples, different machines in which the induction motor 100 operates includes driver/operator interface components such as a touch screen in a cab and/or signals sent via actuation of knobs, buttons, pedals, or other controls within the cab of the machine. The controller 102 also receives operational data from various components of the induction motor 100, including the rotor speed, electrical frequency, the switching patterns map, and the air flow rate within the induction motor 100. In some examples, the controller 102 receives signals from sensors disposed at various locations on the motor 100 (or machine in which the motor 100 operates) to detect rotor speed, pump flow rate, etc. The controller 102 also receives current and voltage feedback data from the different components or material masses of the stator 104 and/or rotor 108. For instance, the controller 102 may receive current and voltage feedback data from one or more of the iron masses (e.g., frame) of the stator 104, the copper masses (e.g., windings 106) of the stator 104, the iron masses (e.g., steel laminations) of the rotor 108, or the copper masses (e.g., conductive bars) of the rotor 108. From the current and voltage feedforward and/or feedback data, the controller 102 determines data such as the DC link voltage, the motor AC RMS line-to-line voltage, and the RMS phase current.

Additionally, although not explicitly shown in FIG. 1, the induction motor 100 includes one or more temperature sensors connected to various components, and configured to provide corresponding temperature data to the controller 102. For instance, as discussed below at least one stator temperature sensor captures the actual temperature of the stator 104 during the operation of the induction motor 100, and transmits temperature data indicative of the temperature of the stator 104 to the controller 102 for comparison with the estimated temperature predicted by the model equation(s) for the stator temperature. This comparison of the actual stator temperature to the predicted stator temperature is then used to modify the model by improving the accuracy of the equations for stator temperature and/or rotor resistance (e.g., Equations 1 and 2) based on the difference between predicted and actual stator temperature.

Figure 2:
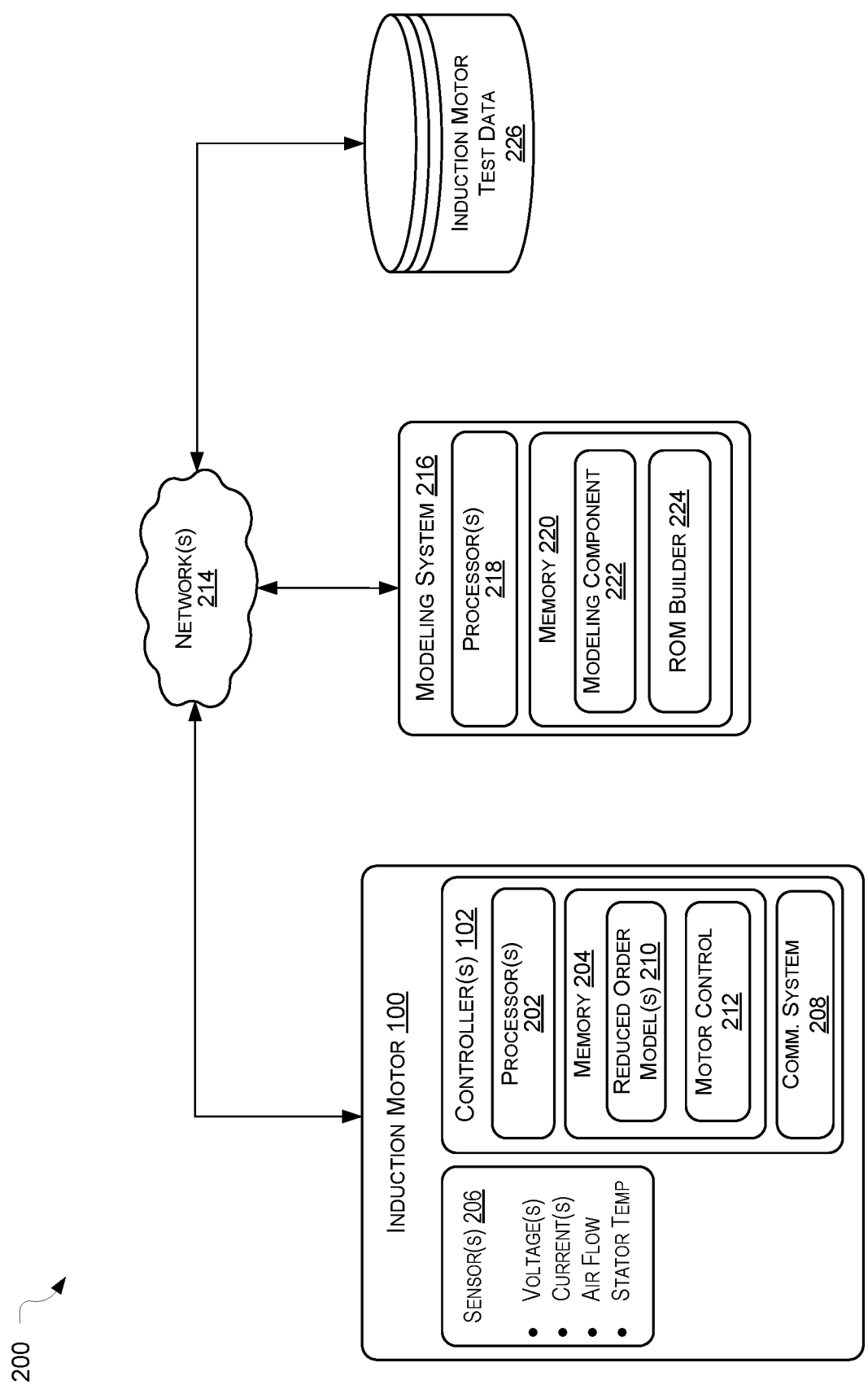
FIG. 2 illustrates an example computing environment including an induction motor and a modeling system configured to build rotor resistance estimation models, in accordance with one or more examples of the present disclosure.

FIG. 2 depicts a computing environment 200 including an induction motor 100, and modeling system 216 configured to generate dynamic models to be used by the controller 102 of the induction motor 100 to estimate rotor resistance and control torque output. As discussed below, the models generated by the modeling system 216 include equations for determining the temperatures and/or resistances of the stator 104 and rotor 108 based on combinations of voltage and current data, electrical frequency, rotor speed, switching patterns, and air flow rates collected during the operation of the induction motor 100. The models generated by the modeling system 216 are dynamic in some examples, allowing the equations of a reduced order model (ROM) 210 to be updated on-board by the controller 102 of the induction motor 100 based on feedback data comparing the stator temperature estimated by the ROM 210 with the actual observed stator temperature. Updating the ROM 210 to converge the estimated stator temperature to the observed stator temperature similarly improves the accuracy of the rotor resistance estimations made by the ROM 210 and allows for more accurate torque control by the controller 102.

In FIG. 2, the induction motor 100 is similar or identical to the corresponding induction motor 100 described above in FIG. 1, but depicts additional systems and components, including hardware, memory, and network components, to describe in more detail the techniques performed by the induction motor 100. FIG. 2 also depicts various components of the modeling system 216, and a data store 226 for induction motor test data used to calibrate (or configure) the models generated by the modeling system 216, and the network(s) 214 over which the components in the computing environment 200 communicate.

As shown in FIG. 2, the modeling system 216 includes processor(s) 218 and memory 220 communicatively coupled with the processor(s) 218. In the illustrated example, the memory 220 and processors 218 of the modeling system 216 store and execute a modeling component 222 and a ROM builder 224, discussed in more detail below. In various implementations, the modeling system 216 is implemented on one or more servers or other computing devices, each of which includes the one or more processors 218 and memory 220 storing computer executable instructions capable of executing the modeling component 222, ROM builder 224 and/or implementing the various additional functionality of the modeling system 216 described herein. The modeling system 216 also includes network interfaces and components (not shown), and is configured to communicate with one or more induction motors 100, data store 226, and/or various other external systems or data sources.

The induction motor 100, as discussed above in FIG. 1, includes a controller 102 configured to receive motor control commands, operational data, and sensor data, and to control the speed, torque output, and other components of the induction motor 100. In this example, the induction motor 100 includes sensors 206 and a communication system 208, as well as the controller 102. The controller 102 stores and executes a ROM 210 received from the modeling system 216 via the communication system 208, including equations for estimating stator and rotor temperatures and/or resistances based on the data received from the sensors 206 during operation of the induction motor 100. The controller 102 also stores and executes a motor control component 212 that controls the speed, torque, fan, and/or other components of the induction motor 100 based on the execution of the ROM 210. To perform the techniques and functionality described herein, the controller 102 includes one or more processors 202 and memory 204 communicatively coupled with the processor(s) 202. In the illustrated example, the memory 204 of the controller 102 stores and executes the ROM 210 (including the on-board software components for executing the ROM 210) and the motor control component 212.

Although the systems and components of the induction motor 100 and the modeling system 216 are illustrated and described as separate components, the functionality of the various systems may be attributed differently than discussed. In various implementations, more or less systems and components are utilized to perform the techniques described herein. Furthermore, although depicted in FIG. 2 as separate systems, in other examples the various components and functionality of the modeling system 216 (e.g., the modeling component 222 and/or ROM builder 224) is incorporated into the induction motor 100.

The modeling system 216 in this example generates software-based models to predict the behaviors of the induction motor 100, and in particular the temperatures and resistances of the stator 104 and rotor 108 under various different operating conditions. The modeling system 216 includes a modeling component 222 that generates, tests, and/or calibrates/configures the equations of the model to predict the stator 104 and rotor 108 temperatures and resistances in a most accurate manner possible, based on the input data received by the modeling component 222. In some examples, the modeling component 222 includes a machine design tool (e.g., CAD-based) configured to perform simulations based on physical specifications (e.g., design, topology, and composition) of the induction motor 100 at various speed-torque combinations across the operating range of the induction motor 100. The modeling component 222 also simulates various operation conditions, including operating times, speeds, and torques, as well as various combinations of ambient conditions (e.g., temperature, pressure, humidity, etc.) to determine the estimated/predicted temperatures and resistances of the induction motor 100 under the various conditions. The modeling component 222 includes analysis processes with electromagnetic, thermal, and mechanical components to determine the multiphysics effects and outputs of the induction motor 100, including air flow and cooling effects, as well as demagnetization, loss energy, hysteresis and other electromagnetic effects.

Accordingly, in some examples, the modeling component 222 generates a model including equations for stator and rotor temperatures/resistances for one particular type of induction motor 100. In such cases, the resulting model is applicable to other induction motors of the same type having the same physical characteristics, and the modeling component 222 generates different models for different types of induction motors. In other examples, the modeling component 222 generates a model specific to one particular induction motor 100, which considers minor motor-to-motor differences or defects, wear, the installation and/or operating environment of the induction motor 100, in which case the modeling component 222 generates different models even for different motors of the same type.

Although air flow is measured directly in some examples, in other examples the air flow within the induction motor 100 is not directly measured. Additionally or alternatively, the air flow is measured via correlating to a pressure drop across a plenum or using hot wire anemometer in various examples. In some cases, the modeling component 222 uses an estimate of air flow (cubic feet per minute) via a known blower motor speed that feeds the air flow to the system. Additionally, in some examples, the induction motor 100 is not an air-cooled motor. For instance, in other examples the induction motor 100 includes water jackets and/or direct oil spray applications. In such examples, the model generated by the modeling component 222, including the equations described herein for stator temperature and/or rotor resistance may include one or both of the cooling media temperature and/or air temperature as a feedback channel.

In some cases, the model generated by the modeling component 222 is a complex first-order model that is configured to predict the stator 104 and rotor 108 temperatures and resistances with a high degree of accuracy, but also requiring a large amount of computational resources. Accordingly, in this example the modeling system 216 includes a ROM builder 224 configured to generate a reduced order model (ROM) 210 based on the complex model determined by the modeling component 222. A ROM 210 is a simplified model configured to capture the behavior a source model using fewer computational resources. Thus, in contrast to a more complex model for predicting the stator 104 and rotor 108 temperatures and resistances, a ROM based on the more complex model is executable in real-time (or near real-time) by the controller 102 of the induction motor 100. In some implementations, the ROM builder 224 uses parametric design tools and/or optimization tools to systematically adjust and evaluate the complex model, identify correlations, and optimize the ROM 210 to most closely captures the behavior of the more complex model generated by the modeling component 222. Equation 1 and Equation 2, discussed above, are examples of simplified equations of a ROM 210 derived from a more complex first-order model configured to predict the stator/rotor temperatures and resistances.

During generation of the model, the modeling system 216 optionally calibrates and/or configures the ROM 210 based on induction motor test data from data store 226. In contrast to the initial model generation process based on the physical specifications of the induction motor 100, the calibration of the model uses actual/observed data from induction motors operating in a production environments. The actual/observed data includes any combination of sensor data readings, temperature readings, motor control commands, motor operational data, motor feedback data. The modeling component 222 and/or ROM builder 224 retrieves the actual/observed data from the data store 226 to evaluate and calibrate the ROM 210 prior to transmission to the induction motor 100. In some examples, the ROM 210 is initially correlated using computational fluid dynamic modeling (CFD), and is further refined with testing data when and/or if such testing data is available. In some instances, the electromagnetic and CFD models are refined (or correlated) during a development process for multiple different types of induction motors. In such instances, a ROM 210 generated for a new design of induction motor 100 includes built-in design assumptions that are more accurate out of the box over time, and including accurate losses in the right location along with accurate heat transfer paths.

As noted above the modeling component 222 in this example is a CAD-based software tool configured to generate the model for predicting temperatures and resistances for the stator 104 and rotor 108 based on the physical specifications of the induction motor 100. Additionally or alternatively, modeling component 222 may include machine-learning algorithms and models that use the actual/observed induction motor test data from data store 226 to build and train machine-learned models to predict stator 104 and rotor 108 temperatures and resistances. In such examples, the modeling component 222 retrieves test data from the data store 226, corresponding to previous scenarios of induction motors 100 operating in production environments. The test data retrieved from data store 226 includes any combination of data used the model equations described herein (e.g., Equation 1 and Equation 2) for predicting stator/rotor temperatures and/or resistances. The test data further includes outcome data, corresponding to torque output produced by the induction motor 100 in each previous scenarios and/or any torque-related real-world effects on the induction motor 100 that were observed in the previous scenarios (e.g., engine stalls, higher/lower pump pressures, component breakage due to excess torque, etc.). During the machine-learning model training process, the modeling component 222 analysis the induction motor test data in view of the model outputs, and adjusts the nodes/weights of the model to more accurately predict the known rotor resistance from the test data based on the input data. In such examples, the ROM 210 is implemented using neural network data structure having one or more levels, various different node configurations, and randomly assigned initial node weights, and a training component within the modeling system 216 uses one or more regression algorithms, instance-based algorithms, Bayesian algorithms, decision tree algorithms, clustering algorithms artificial neural network algorithms, and/or deep learning algorithms, to train the ROM 210. In some examples, the model training is performed by assuming some defined thermal network circuit. In such examples, the model parameters are modified to minimize the difference between estimated temperatures and actual feedback temperatures, and the optimal settings are converged using one or more techniques such as brute force, Monte Carlo, Kalman filters and/or machine learning techniques.

For calibrating and/or training the ROM 210 as described above, in some examples the modeling system uses induction motor test data specific to the particular induction motor 100, and thus considers any particular motor differences or defects, wear, the installation and/or operating environment of the induction motor 100. In other examples, the modeling system 216 calibrates and/or trains the ROM 210 using data that need not specific to the particular induction motor 100 that will receive the ROM 210, but is specific to the one type of induction motor 100 (e.g., having the same design specifications).

After generating (and/or calibrating) the ROM 210, the modeling system 216 provides the ROM 210 to the induction motor 100, where it is stored in the on-board memory 204 and executed to determine the estimated temperatures and/or resistances of the stator 104 and rotor 108 in real-time during the operation of the induction motor 100. As described in more detail below, the controller 102 executes the ROM 210 to determine an estimated rotor resistance based on data received from sensors 206 while the induction motor 100 is running in a production environment. The sensors 206 in this example include various motor control command sensors (e.g., sensors sensing speed and torque commands from a driver or operator), motor operation sensors (e.g., sensors sensing operating parameters such as rotor speed, electrical frequency, stator temperature, fan speed, etc.), motor electrical feedback sensors (e.g., voltage and current feedback sensors from various motor components), and/or ambient environment sensors (e.g., temperature, humidity, and air pressure sensors in and around the induction motor 100). After calculating the estimated rotor resistance using the ROM 210, the controller 102 uses the motor control component 212 to determine torque control output for the induction motor 100 that more accurately matches a desired torque output received via a torque command from the machine driver or operator.

Additionally, as described in more detail below, as the controller 102 executes the ROM 210 on-board the induction motor 100, the ROM 210 is also evaluated and modified during operation in the production environment to improve the rotor resistance estimations output by the ROM 210. In some examples, the ROM 210 includes equations that predict both the stator temperature and the rotor resistance During execution, the controller 102 receives the actual observed temperature of the stator 104 while the induction motor 100 is operating, and modifies the equations of the ROM 210 to converge the predicted stator temperature to the actual observed stator temperature. The ROM 210 performs corresponding changes to the equation the predicts the resistance to provide a more accurate rotor resistance estimation during the operation of the induction motor 100.

The various components and systems within the computing environment 200 also include communication system(s) that enable communication between the various computing device(s) and systems (e.g., induction motor 100 and modeling system 216) and/or other local or remote device(s) or servers. For instance, the communication system(s) 208 of the induction motor 100 facilitate communication with the modeling system 216 via one or more networks 214. In various examples, the communication network(s) 214 enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

The processor(s) 202 of the induction motor 100, and the processor(s) 218 of the modeling system 216 include any suitable processor capable of executing instructions to process data and perform operations as described herein. By way of example and not limitation, the processor(s) 202 and 218 comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices are considered processors in so far as they are configured to implement encoded instructions.

Memory 204 and memory 220 are examples of non-transitory computer-readable media. Memory 204 and memory 220 each store an operating system and/or one or more software applications, instructions, programs, and/or data to implement the methods and techniques described herein, and perform the various functions attributed to those systems. Memory 204 and memory 220 are implemented using any suitable memory technology, such as static random-access memory (SRAM), synchronous dynamic RAM (SDRAM), nonvolatile/flash-type memory, or any other type of memory capable of storing information. The architectures, systems, and individual elements described herein include many other logical, programmatic, and physical components, of which those shown in the accompanying figures are merely examples that are related to the discussion herein.

It should be noted that while FIG. 2 is illustrated as a distributed system, in alternative examples, any or all components of the modeling system 216 are implemented within the induction motor 100, and/or vice versa. Moreover, although various systems and components are illustrated as being discrete systems, these examples are illustrative and more or fewer discrete systems may perform the various functions described herein.

Figure 3:
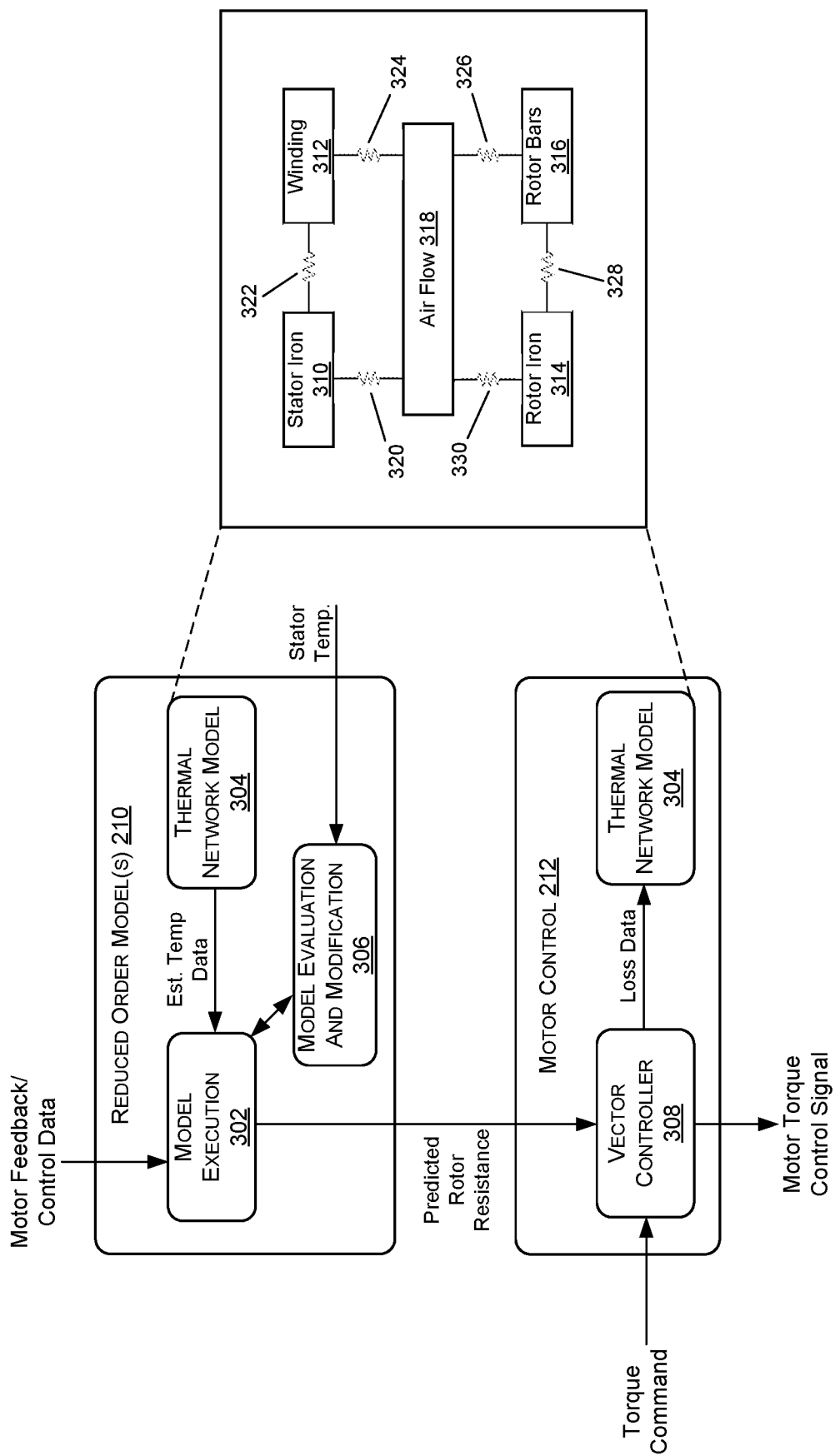
FIG. 3 illustrates an example of a reduced order model configured to estimate rotor resistance within the controller of an induction motor, in accordance with one or more examples of the present disclosure.

FIG. 3 depicts an example of a ROM 210 and a motor control component 212 that, when executed by a controller 102, respectively estimate the rotor resistance during operation of the induction motor 100, and control the torque output of the induction motor 100 based the estimated rotor resistance. In this example, the ROM 210 and motor control component 212 are similar or identical to the corresponding ROM 210 and motor control component 212 described above in FIG. 2, but depict additional components to describe in more detail the techniques performed by the controller 102 of the induction motor 100.

As noted above, the ROM 210 includes one or more equations for predicting (or estimating) the temperatures and/or resistances of the stator 104 and rotor 108 during the operation of the induction motor 100. The controller 102 executes the ROM 210, which in this example includes a model execution component 302 and a model evaluation and modification component 306, and the output from the ROM 210 is used by the motor control component 212 to control the torque output of the induction motor 100. In this example, the ROM 210 outputs an estimated rotor resistance for the induction motor 100, and the motor control component 212 uses the estimated rotor resistance within its torque control strategy to improve the torque accuracy with respect to a desired torque output of the motor.

The model execution component 302 of the ROM 210, when executed by the controller 102, receives various sensor/operational data during the operation of the induction motor 100, and applies the equations of the ROM for predicting the stator and rotor temperatures and/or resistances. In some examples, the model execution component 302 executes Equation 1 and Equation 2, discussed above, to calculate the predicted stator temperature and/or the predicted rotor resistance based on the DC link voltage, the motor AC RMS line-to-line voltage, the RMS phase current, the rotor speed, the electrical frequency, the switching patterns map, and/or the air flow rate within the induction motor 100. In such examples, the model execution component 302 retrieves the input variables for Equation 1 and Equation 2 from the sensors 206 of the induction motor 100 during operation. Sensors 206 of the induction motor 100 include electrical feedforward and feedback sensors that provide the DC link voltage, the motor AC RMS line-to-line voltage, the RMS phase current, the electrical frequency, and the switching patterns map. Sensors 206 also include operational sensors of the induction motor 100 including the rotor speed sensor and cooling fan speed. Additionally, sensors 206 include one or more temperature sensors within the induction motor 100 and/or within the environment of the induction motor 100, including one or more stator temperature sensors and ambient sensors to measure the temperature, air pressure, and humidity at various locations internal and/or external to the induction motor 100. Further, in some cases the model execution component 302 receives estimated temperature data for certain components within the induction motor 100 from a thermal network model 304, discussed in more detail below.

Using the retrieved input data retrieved via sensors 206 of the induction motor 100 during operation at a production environment, the model execution component 302 calculates the estimated stator temperature (e.g., using Equation 1) and/or the estimated rotor resistance (e.g., using Equation 2). Although Equations 1 and 2 in this example respectively calculate the estimated stator temperature and rotor resistance, in other examples the model execution component 302 additionally or alternatively calculates stator resistance (which is directly proportional to stator temperature) and/or rotor temperature (which is directly proportional to rotor resistance). Further, although this example describes the model execution component 302 receiving data from sensors 206 and calculating the estimated stator temperature and rotor resistance once, in other examples the model execution component 302 performs these operations multiple times. In such examples, the model execution component 302 periodically or continuously receives or retrieves updated sensor/operational data from the sensors 206, periodically or continuously re-calculates updated estimates for stator temperature and rotor resistance based on the updated sensor/operational data.

After the model execution component 302 is used to calculate the predicted stator temperature and/or predicted rotor resistance (e.g., using Equations 1 and 2), the controller 102 executes the model evaluation and modification component 306 to revise the equations of the ROM 210. In some examples, the model evaluation and modification component 306 compares the predicted stator temperature determined from Equation 1 with the actual observed temperature reading(s) of the stator 104 received from the sensors 206. As discussed above, in this example sensors 206 do not directly measure the temperature or resistance of the rotor 108; however, the stator 104 is stationary during operation and stator temperature reading(s) are captured by the sensors 206 while the induction motor 100 is running. Accordingly, the model evaluation and modification component 306 compares the actual observed stator temperature reading(s) to the predicted stator temperature determined from Equation 1, and uses the difference between the actual and predicted stator temperatures to modify the equations of the ROM 210. In this example, the ROM 210 equations for stator and rotor resistance are modified into the following Equations 3 and 4.

$$\frac{d}{dt}(T_s) = f_s(T_s, R_r, V_{dc}, V_m, I_m, W_r, ws, swp, af) - K_1(Ts - Ts\_measured) \quad \text{Equation 3}$$

$$\frac{d}{dt}(R_r) = f_r(T_s, R_r, V_{dc}, V_m, I_m, W_r, ws, swp, af) - K_2(Ts - Ts\_measured) \quad \text{Equation 4}$$

In this example, the term $(T_s - T_{s\_measured})$ represents the difference between the predicted stator temperature $(T_s)$ calculated using Equation 1 and the actual stator temperature $(T_{s\_measured})$. Equation 3 represents the ROM 210 equation for calculating the stator resistance, modified by a coefficient factor $(k_1)$ of the difference between the predicted and actual stator temperature. Similarly, Equation 4 represents the ROM 210 equation for calculating the rotor resistance, modified by a different coefficient factor (k2) of the difference between the predicted and actual stator temperature. Equations 3 and 4, which are modified on-board and during the operation of the induction motor 100 by the model evaluation and modification component 306, thus provide more accurate stator and rotor resistance predictions. Specifically, Equations 3 and 4 and any other equations within the ROM 210 are updated based on the factor $(T_s - T_{s\_measured})$ causing the predicted stator temperature and actual stator temperature to converge, and therefore similarly cause the predicted stator and rotor resistance values to converge more closely on the actual stator and rotor resistances.

In some examples, a technique for modifying the ROM 210 equations for stator and rotor resistance shown above in Equations 3 and 4 applies a temperature gain to implement the modifications. In such examples, adjusting the estimated temperature of the rotor 108 is performed by scaling the error of the estimated versus the actual stator temperature. For the purposes of illustration, in one example an estimated stator temperature equals 100° C., the actual stator temperature equals 110° C., and the inlet temperature equals 50° C. In this example, the estimated stator temperature delta equals 50° C. (100° C.−50° C.), and the actual stator temperature delta equals 60° C. (110° C.−50° C.), and thus in this example, the temperature error gain=1.2 (60° C./50° C.).

Additionally or alternatively, a technique for modifying the ROM 210 equations for stator and rotor resistance shown above in Equations 3 and 4 scales the error of the estimated stator temperature versus the actual stator temperature to modify the thermal resistance terms of the equations. For instance, if the stator 104 is sufficiently hot this technique assumes that the normal cooling process is compromised be a blocking cooling source or contamination building, etc., that creates reduced cooling performance. The error is then used to modify the thermal network, described in more detail below. For instance, using the error gain in the above example of 1.2, in this example the resistances between the individual rotor components (e.g., rotor iron, rotor bars) and the air flow is adjusted within the thermal mode by multiplying these resistances by the error gain of 1.2.

Continuing with this example, the controller 102 executes the modified equations of the ROM 210 to calculate a predicted rotor resistance (and/or rotor temperature). The controller provides the predicted rotor resistance to the motor control component 212 (e.g., an inverter controller), which uses the predicted rotor resistance to control the torque output of the induction motor 100. As shown in this example, the motor control component 212 receive a torque command from a driver/operator of the induction motor 100. In some cases, the motor control component 212 also receives various motor operational data, such as the motor electrical feedforward and/or feedback data (e.g., currents and/or voltages to and from the motor components), and the current motor speed (e.g., RPMs). The vector controller 308 of the motor control component 212 uses the torque command, current motor operational data, and the rotor resistance predicted by the ROM 210, to determine the current vector (Id, Iq) that will produce the desired torque output. In some examples, the vector controller 308 manipulates the rotor resistance, for instance by increasing or decreasing the rotor resistance to produce more or less torque output from the induction motor 100.

Additionally, as depicted in FIG. 3, the ROM 210 and/or motor control component 212 access a thermal network model 304 of the induction motor 100 in some examples. In such examples, the thermal network model 304 is implemented as a separate model from ROM 210, and is used to compute and track the temperatures of various major components within the induction motor 100. The thermal network model 304 tracks the temperatures of different thermal masses within the induction motor 100, based on the estimates of the temperatures of the masses, the loss energy put into the masses, and the temperature/air flow of the surrounding air. These factors, in combination with the characteristics of a component (e.g., material type, mass, shape, etc.) determine how different components in the induction motor 100 heat up, cool down, and/or dissipate heat back into the surrounding air.

In this example, the motor control component 212 provides energy loss data to the thermal network model 304, including the specific currents and voltages applied to the different components of the induction motor 100 at different rates/times during operation. An example portion of the thermal network model 304 is shown depicting four components of the induction motor 100: the stator iron mass 310, the stator copper winding 312, the rotor iron mass 314, and the rotor bars 316. The thermal network model 304 uses component material, design, and composition data, as well as energy loss data for each component and the air flow 318 to track the temperatures of the components 310-316. The thermal network model 304 also calculates the resistances 320-330 between each of the components 310-316 and the other components and/or air flow 318. In some examples, the thermal network model 304 includes one or more equations that receive the energy loss of the stator iron 310, stator winding 312, rotor iron 314, and rotor bars 316, along with the windage loss of the induction motor 100, and the ambient temperature (e.g., in degrees C.) and air flow rate (e.g., in cubic feet/min) within the induction motor 100, to calculate estimated temperatures for the stator 104 and rotor 108. In some instances, the temperature estimates from the thermal network model 304 are provided back to ROM 210 to be used as input data in the calculations of predicted rotor and stator temperatures and resistances. In an example, the estimated stator temperature is compared with actual feedback temperatures when the feedback is available. In this example, if the measured stator feedback temperature is no longer available for some reason, the estimated temperature takes the place of the measured temperature for protections and deratings, and the estimated rotor temperature is used in order to accurately adjust the rotor resistance from a nominal temperature.

In some examples, the power loss of the stator 104 and rotor 108 are calculated using Equations 5 and 6 below:

$$P_s = 3*(I_s^2)*R_s \quad \text{Equation 5}$$

$$P_r = 3*(I_r^2)*R_r \quad \text{Equation 6}$$

In this example, the term $P_s$ represents the power loss of the stator 104, and $P_r$ represents the power loss of the rotor 108. $I_s$ represents the stator current, $I_r$ represents the rotor current, $R_s$ represents the stator resistance and $R_r$ represents the rotor resistance.

Continuing with this example, using the power loss values calculated for the stator 104 and rotor 108, the temperatures of the stator 104 and rotor 108 is estimated using Equations 7 and 8 below:

$$T_s = T_a + K_s * \int [(P_s - P_{cs})] * dt \quad \text{Equation 7}$$

$$T_r = T_a + K_r * \int [(P_r - P_{cr})] * dt \quad \text{Equation 8}$$

In this example, the term $T_s$ represents the stator temperature and the $T_r$ represents the rotor temperature. $T_a$ represents the ambient temperature, $K_s$ represents the thermal resistance for the stator 104, and $K_r$ represents the thermal resistance for the rotor 108. $P_{cs}$ represents the power that the cooling system is able to extract from the stator 104, and $P_{cr}$ represents the power that the cooling system is able to extract from the rotor 108.

Figure 4:
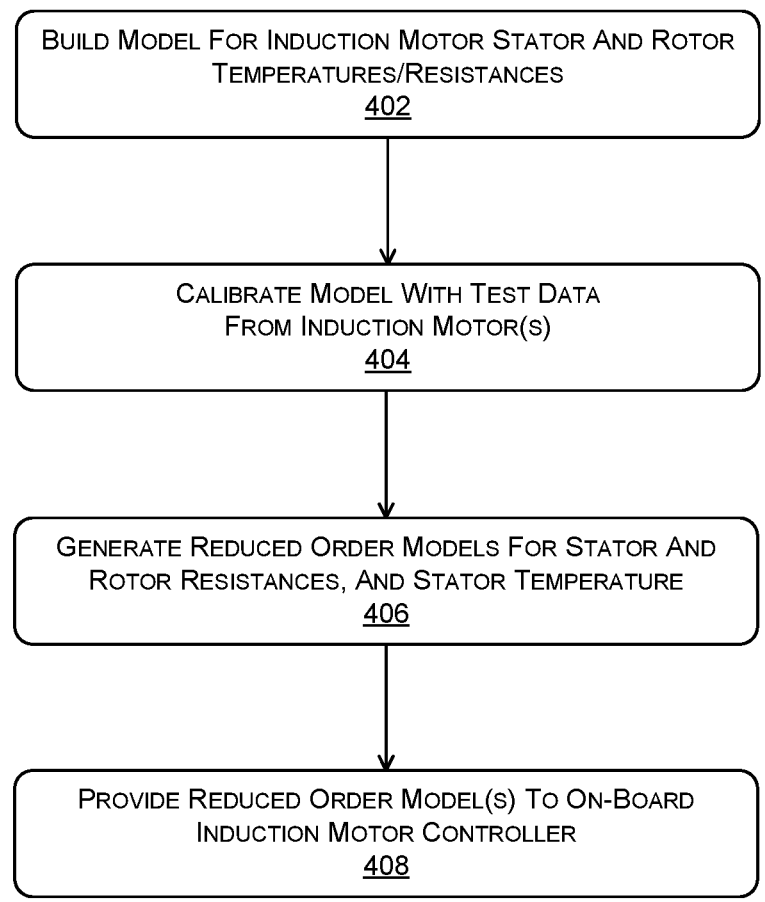
FIG. 4 is a flowchart illustrating an example process of building a model and reduced order model for estimating stator and rotor temperatures and resistances, in accordance with one or more examples of the present disclosure.

FIG. 4 is a flowchart depicting an example process 400 of generating a reduced order model (ROM) 210 with equations for predicting stator and rotor temperatures and/or resistances on an induction motor 100. As discussed below, process 400 describes building a simplified ROM 210 based on a more complex source model for predicting the temperatures and/or resistances of the stator 104 and rotor 108. The ROM 210 simplifies and captures the behavior of the more complex model, allowing the ROM 210 to be executed on-board the induction motor 100, in real-time or near real-time during operation of the motor in a production environment. Thus, as described below, the ROM 210 generated in process 400 is stored and executed by the controller 102 of the induction motor 100, and is updated dynamically by the controller 102 based on the operation of the induction motor 100, to provide a more accurate rotor resistance for controlling torque output. In this example, the techniques and operations of process 400 are performed by a modeling system 216 operating within a computing environment 200. However, in various other examples, some or all of process 400 is performed by the modeling system 216 and/or a controller 102 of an induction motor 100, alone or in combination with any of the additional components described above in FIGS. 1-3.

At operation 402, the modeling system 216 builds a complex model including equations for predicting stator and rotor temperatures and/or resistances for an induction motor 100. In some examples, the modeling component 222 uses finite element analysis (FEA) software tools and/or CAD-based simulation tools to build and execute a model for predicting stator and rotor temperatures and/or resistances. In such examples, the modeling component 222 receives and analyzes the physical specifications (e.g., component sizes, shapes, material compositions, etc.) for each physical part/component in a particular induction motor 100. Computational fluid dynamic software and/or lumped parameter modeling tools are used in some cases, to run a simplified thermal model that executes relatively fast while retaining sufficient accuracy with respect to complex thermal analysis software. In some instances, the modeling component 222 includes processes to analyze the electromagnetic, thermal, and mechanical components of the induction motor 100, to determine the multi-physics effects and outputs of the motor under various different operating conditions and environments. As noted above, in some examples the modeling component 222 builds a model in operation 402 that is specific to particular induction motor 100 and/or a particular type/design of induction motor 100.

At operation 404, the modeling system 216 retrieves and uses test data associated with one or more induction motors 100 to calibrate the model generated in operation 402. In this example, the modeling system 216 retrieves induction motor test data from a data store 226. The test data includes historical data observed/capture by one or more of the induction motors 100 of the type for which the model was built. The test data includes sensor data, operational data, and the like captured for specific scenarios while the induction motors 100 were operating in real-world production environments. In contrast to performing software simulations based on the physical specifications of the induction motor 100, to create the model in operation 402, the calibration based on actual test data in operation 404 takes into account minor differences in induction motors 100 operating in production environments, including minor factory defects wear, differences in installation and/or environmental differences, etc.

At operation 406, the modeling system 216 generates a ROM 210 based on the complex model generated and calibrated in operations 402-404. As discussed above, modeling system 216 includes a ROM builder 224 configured to generate a reduced order model (ROM) 210 based on the complex model determined by the modeling component 222. In some examples, the ROM builder 224 uses parametric design tools and/or optimization tools in operation 405, to adjust and evaluate the source model, to identify correlations, and optimize the ROM 210. In certain instances, the ROM builder 224 uses software to define the heat flow magnitudes give a thermal delta in the computational fluid dynamics tools as a standard output. The ROM 210 includes a number of equations for predicting temperatures and/or resistances of the stator 104 and/or rotor 108 of the induction motor, such as a stator temperature prediction equation and a rotor resistance prediction equation.

At operation 408, the modeling system 216 provides the ROM 210 to the on-board controller 102 of the induction motor 100. For instance, the modeling system 216 transmits the ROM 210 via the network(s) 214, to the controller 102 of the induction motor 100. The controller stores the ROM 210 within the memory 204 for on-board execution of the ROM 210 equations while the induction motor 100 is running. In some examples, the modeling system 216 builds, calibrates, and transmits different ROMs 210 to different induction motors 100. In such examples, the differences between ROMs 210 are based on the different physical specifications of the induction motors 100 and/or the different test data or calibration processes used at operation 404.

Figure 5:
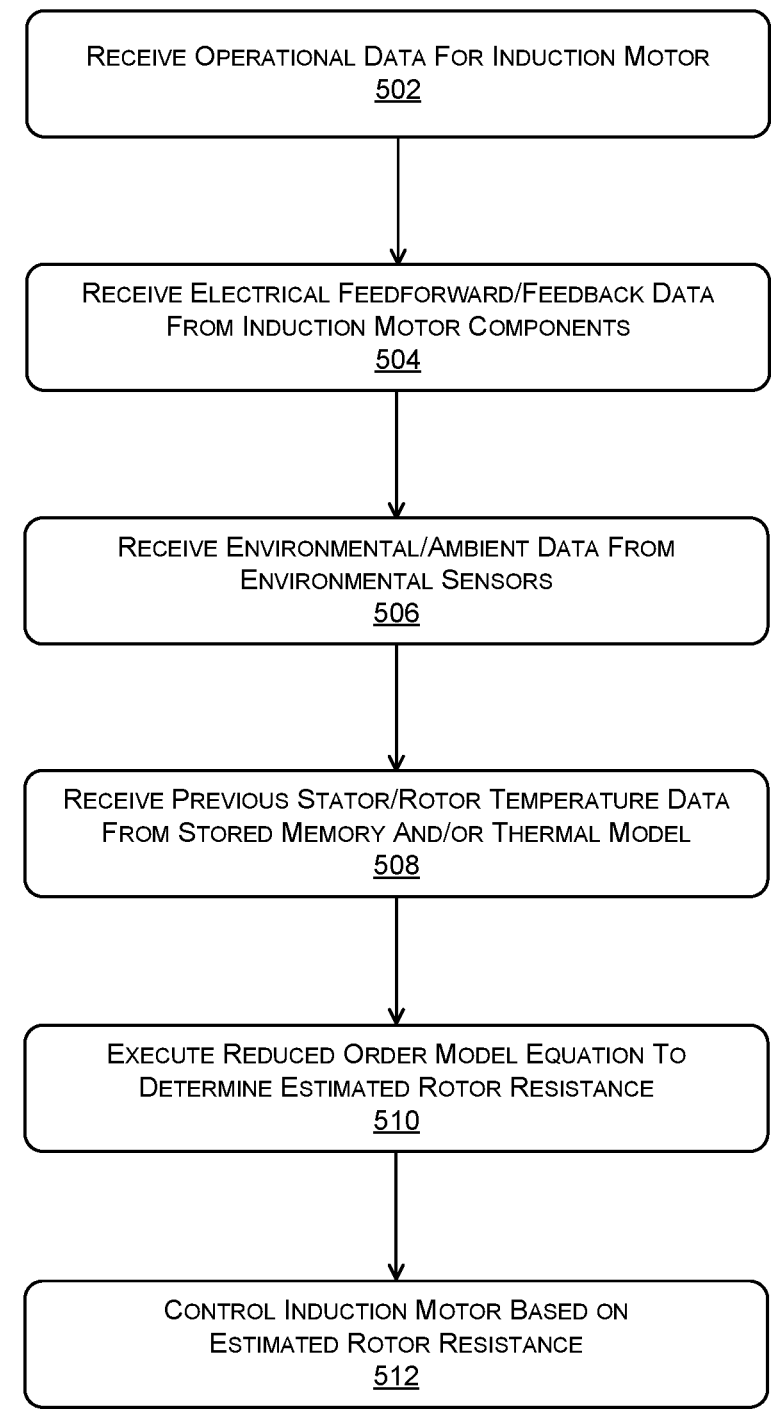
FIG. 5 is a flowchart illustrating an example process of executing a reduced order model to estimate rotor resistance and control torque output of an induction motor, in accordance with one or more examples of the present disclosure.

FIG. 5 is a flowchart depicting an example process 500 of executing a ROM 210 by a controller 102 to predict an estimated rotor resistance during the operation of the induction motor 100. In this example, the ROM 210 includes an equation for predicting rotor resistance, and the controller 102 executes the equation based on various types of input data captured while the induction motor 100 is running. The rotor resistance equation executed in this example uses multiple types of input data, including sensor data, operational data for the induction motor 100, electrical feedforward/feedback data, and environmental data, to predict/estimate the rotor resistance. Thus, the rotor resistance equation in this example is more robust and more accurate than rotor resistance determinations based on less input data and/or rotor resistance determinations that use previous data and are performed by a separate system other than the induction motor 100.

Although this example describes a single execution of an equation for predicting rotor resistance, in other examples the controller 102 executes the rotor resistance prediction multiple times, including on a periodic or continuous basis in response to changes to any of the input data. Additionally, in other examples similar or identical processes are used by the controller 102 to execute other equations within the ROM 210, such as equations for predicting rotor temperature, stator temperature, and/or stator resistance of the induction motor 100. For instance, for an operating induction motor 100 the rotor temperature is directly proportional to the rotor resistance. Thus, in another example a similar/identical process is performed to compute the predicted rotor temperature, which is converted to the predicted rotor resistance.

At operation 502, the controller 102 (via execution of the ROM 210) receives operational data for the induction motor 100. The operational data includes, for instance, the current rotor speed, current torque, and/or current cooling fan speed. In some examples, the operational data is retrieved from the memory 204 of the controller 102, and corresponds to the most recent control commands (e.g., rotor speed commands, torque commands, cooling fan commands) issued by the controller 102 to control the operation of the induction motor 100.

At operation 504, the controller 102 receives from sensors 206 electrical feedforward and/or feedback data associated with one or more electrical components of the induction motor 100. In some examples, the feedforward data includes voltage and/or current values applied by the controller 102 to the various components of the induction motor 100, and the feedback data includes voltage and/or current values received back at the controller 102 from the components of the induction motor 100. Additionally or alternatively, the controller 102 calculates or derives data values in operation 504 based on the raw electrical feedforward/feedback data. In some examples, the feedforward/feedback data received at operation 504 includes one or more of the DC link voltage, the motor AC RMS line-to-line voltage, the RMS phase current, the electrical frequency of the induction motor 100, and switching patterns map of the induction motor 100. Some or all of the feedforward/feedback data received at operation 504 is derived in some cases based on the current/voltage sent to and received from the iron/steel and copper/aluminum masses within the stator 104 and rotor 108.

At operation 506, the controller 102 receives environment data via one or more sensors 206 associated with the induction motor 100. In some examples, the environment data includes temperature data, humidity data, and/or pressure data based on readings from various environmental sensors in and around the induction motor 100. For instance, temperature sensors on the stator 104 and elsewhere within (or external to) the induction motor 100 transmit temperature data to the controller 102. As noted above, the controller 102 uses the environmental data to determine, among other things, the surrounding air temperature and/or air flow rate data within the induction motor 100.

At operation 508, the controller 102 receives one or more previous temperature data/readings for the stator 104 and/or for the rotor 108. In various examples, the previous temperature data/readings include previous calculations performed by the controller 102 using the ROM 210 equations, direct temperature readings from temperature sensors (e.g., a stator temperature sensor), and/or stator and rotor temperature estimations received from a thermal network model 304.

At operation 510, the controller 102 executes an equation of the ROM 210 to determine an estimated rotor resistance, based on the data received in operations 502-508 during the operation of the induction motor 100. As noted above, the estimated rotor resistance is calculated by the controller 102 while the induction motor 100 is running, and represents the rotor resistance estimate for the current time (e.g., in real-time or near real-time) based on the most recent data readings collected at the induction motor 100 in operations 502-508. In some cases, the controller executes an equation similar or identical to Equation 2 discussed above, in which the estimated rotor resistance is calculated based on the DC link voltage, the AC RMS line-to-line voltage, the RMS phase current, the rotor speed, the electric frequency, the switching patterns map, and the air flow. In this example, the air flow is calculated based on the based on the current cooling fan speed and the current air pressure, temperature, humidity, and/or other environmental data potentially affecting the air flow rate through the induction motor 100.

At operation 512, the controller 102 generates one or more motor control commands to control the torque output of the induction motor 100 based on the estimated rotor resistance determined at operation 510. In some cases, the motor control component 212 of the controller 102 determines and outputs a current vector to produce a desired torque based on the estimated rotor resistance. Additionally or alternatively, the motor control component 212 manipulates the resistance at the rotor 108, by increasing or decreasing the resistance to produce more or less torque output. As described herein, process 500 thus provides a robust and accurate estimation of rotor resistance for an induction motor 100, based on multiple input data factors, and which is performed quickly by the on-board controller 102 to reflect the current state and operating conditions of the induction motor 100.

Figure 6:
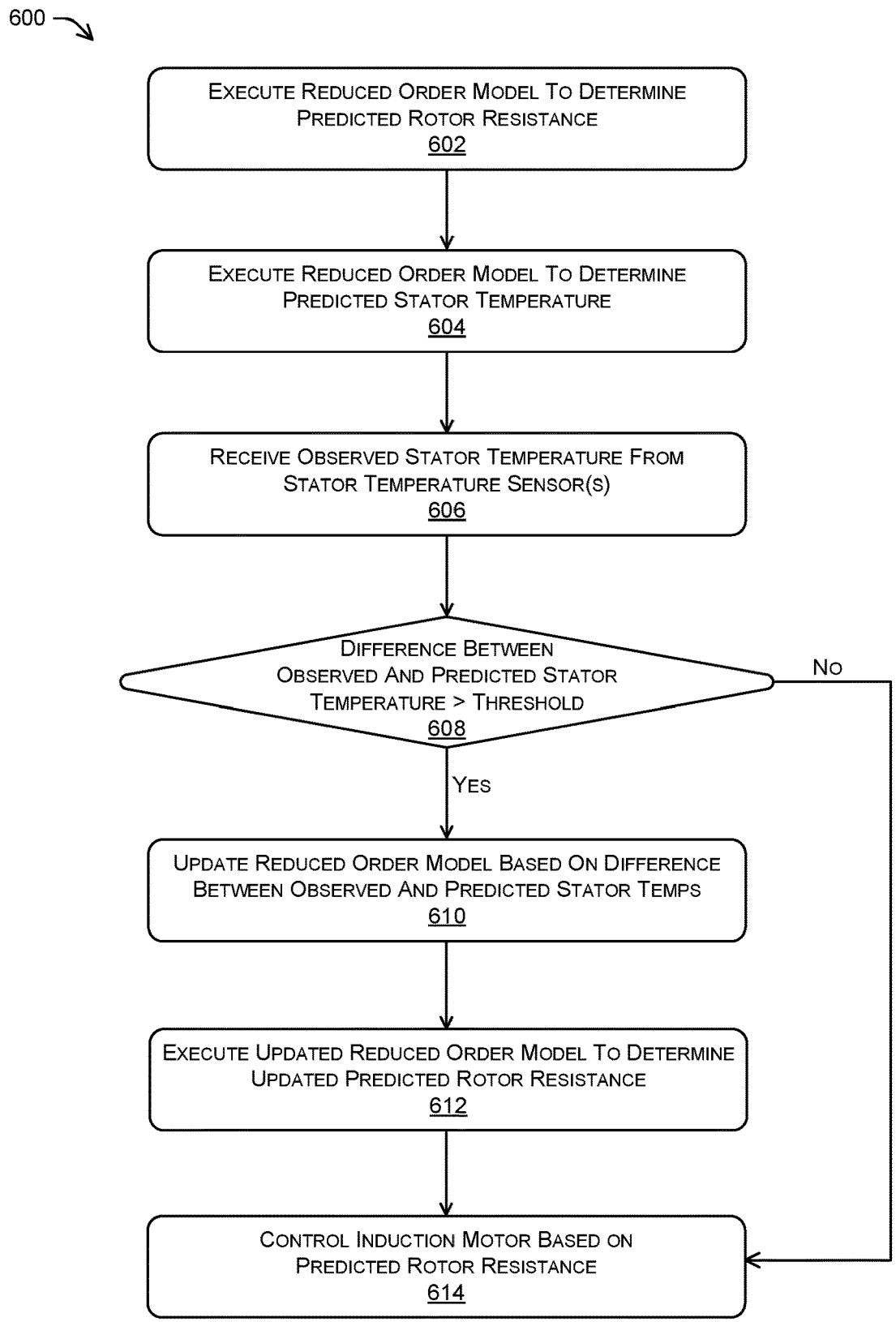
FIG. 6 is a flowchart illustrating an example process of updating a reduced order model for estimating rotor resistance, in accordance with one or more examples of the present disclosure.

FIG. 6 is a flowchart depicting an example process 600 of updating a ROM 210 dynamically during the operation of an induction motor 100, including modifying and executing ROM 210 equation(s) to determine a more accurate prediction of rotor resistance. As discussed below, process 600 includes the on-board controller 102 of the induction motor 100 calculating a difference between a stator temperature predicted by the ROM 210 and an actual stator temperature observed by temperature sensor, and using the difference to update the equations of the ROM 210 and improve the accuracy of the predicted rotor resistance. Specifically, the ROM 210 is updated to converge the predicted stator temperature on the actual observed stator temperature, and a corresponding update is made to the rotor resistance equation within the ROM 210, bring the predicted rotor resistance closer to the actual current rotor resistance of the induction motor 100.

At operation 602, the controller 102 executes an equation within the ROM 210 to determine an estimated current rotor resistance for the induction motor 100. In some examples, operation 602 is similar or identical to the operations 502-510 described above. Specifically, the controller 102 receives/retrieves various input data during the operation of the induction motor 100, and executes a rotor resistance equation (e.g., Equation 2) within the ROM 210 using the input data. As discussed below, operation 602 is optional in some implementations, such as when the controller 102 determines that an updated to ROM 210 is necessary and thus any rotor resistance prediction prior to the update/modification would be discarded.

At operation 604, the controller 102 executes another example equation within the ROM 210 to determine an estimated current stator temperature for the induction motor 100. As discussed above, in some examples the equation within the ROM 210 to predict the current stator temperature (e.g., Equation 1) at the induction motor 100 is similar to the equation to predict the rotor resistance (e.g., Equation 2). For instance, in the above example Equations 1 and 2 are based on the same input variables and use data retrieved at the same or similar times while the induction motor 100 is running. In some instances, however, one or more of the coefficients used for Equation 1 and Equation 2 are different based on the model building and calibrating processes described above.

At operation 606, the controller 102 receives data from a stator temperature sensor 206 of the induction motor 100. In some examples, the temperature data received at operation 606 includes actual temperature readings from temperature sensors 206 associated with the stator 104, collected at one or more time(s) at or near (e.g., within a predetermined time threshold of) the times at which the equation input data was collected for executing the equations in operations 602 and 604. In various examples, the temperature data received at operation 606 includes a single reading from a stator temperature sensor 206, or multiple readings, such as an average of multiple readings from a stator temperature sensor 206 over a recent time window and/or an average of readings from multiple temperature sensors 206 positioned on or near the stator 104. Additionally, although in this example the temperature data received at operation 606 includes readings from temperature sensors 206, in other examples operation 606 includes receiving estimated stator temperature data from a thermal network model 304 or another non-sensor data source.

At operation 608, the controller 102 calculates and/or otherwise determines a difference between the stator temperature predicted by the ROM 210 in operation 604, and the actual observed stator temperature received in operation 606. In this example, the controller 102 compares the difference to a threshold value (which may be zero in some cases) to determine whether at least a minimum difference is present between the predicted and actual stator temperature. If there is no difference between the observed and predicted stator temperatures, or if the difference is less than the threshold value (608:No), then process 600 proceeds to operation 614 at which the controller 102 issues one or more motor control commands to control the torque output of the induction motor 100 based on the estimated rotor resistance determined at operation 602. In this example, operation 614 is similar or identical to operation 512 discussed above.

However, if the difference between the observed and predicted stator temperatures, is greater than the threshold value (608:Yes), then at operation 610 the controller updates the ROM 210 based on the difference between the stator temperatures predicted in operation 604 and the actual stator temperature observed in operation 606. As discussed above in reference to the model evaluation and modification component 306, in operation 610 the controller 102 revises one or more equations of the ROM 210 based on the difference between the predicted and observed stator temperatures. In this example, the controller 102 identifies a first update or modification to the equation for predicting the stator temperature (e.g., Equation 1) that results the stator temperature predicted by the modified equation matching the actual observed stator temperature. In the example Equations 3 and 4, the modification based on the difference between the predicted and actual stator temperatures is the term $(T_s - T_{s\_measured})$, multiplied by a coefficient factor which may be the same or different for the different equations of the ROM 121. For instance, in Equation 3 representing the updated equation for calculating the stator resistance the modification term $(T_s - T_{s\_measured})$ is multiplied by the coefficient factor $(k_1)$, while in Equation 4 representing the modified equation for calculating the rotor resistance the modification term $(T_s - T_{s\_measured})$ is multiplied by a different coefficient factor (k2). However, in these examples the modifications to the equations of the ROM 210 are based on the difference between the predicted and observed stator temperatures.

At operation 612, the controller 102 executes the updated rotor resistance equation (e.g., Equation 4) to determine an updated prediction of the current rotor resistance value at the induction motor 100. Operation 612 is similar or identical to operation 602 discussed above. In some examples, the controller 102 uses the same input data initially collected in operation 602 to execute the rotor resistance prediction, while in other examples the controller 102 retrieves updated input data in operation 612 and executes the modified rotor resistance equation using the updated input data.

At operation 614, as noted above the controller 102 generates one or more motor control commands to control the torque output of the induction motor 100 based on the most recent estimated rotor resistance, corresponding to either the initial rotor resistance prediction performed in operation 602 or the updated rotor resistance prediction performed in operation 612. As discussed above, operation 614 is similar or identical to operation 512 discussed in reference to FIG. 5. In some cases, controller 102 executes the motor control component 212 to determine and output a current vector to produce a desired torque based on the estimated rotor resistance. Additionally or alternatively, the controller 102 manipulates the resistance at the rotor 108, by increasing or decreasing the resistance to produce more or less torque output.

INDUSTRIAL APPLICABILITY

As discussed above, the present disclosure relates to using dynamic models to estimate rotor resistances and control torque outputs within induction motors. The various techniques and systems described herein allow a control system within an induction motor to more accurately estimate the rotor temperature and/or rotor resistance during the operation of the motor. The control system achieves greater torque accuracy output for the motor, by using the improved techniques for estimating the rotor resistance and then manipulating the rotor resistance to output the desired torque output. The greater torque accuracy achieved by the various techniques and systems described herein results in various improvements to the overall operation of induction motors in many different environments and settings. As an example, for induction motors within mining and construction equipment, the techniques described herein reduce or eliminate engines stalls caused by torque inaccuracy. For induction motors used to drive industrial pumps, the techniques described herein improve the pump pressure accuracy and overall pump performance, and so on. Additionally, the techniques and systems described herein improve the reliability and durability of machines that use induction motor drive systems by reducing excess wear and broken components caused by torque inaccuracy. The techniques and systems described herein also improve the thermal stability of the stator and other components within the induction motor, thereby reducing or eliminating motor shutdowns or other damage caused by thermal deviations.

Additional improvements to induction motor systems result from the techniques described herein for more accurately estimating rotor resistance based on an on-board dynamic model that takes into account the differences in individual motors and production environments. In contrast to conventional systems that measure rotor temperatures and resistances during lab testing processes in controlled environments, the techniques described herein include building and executing an on-board model within the controller of the induction motor, and dynamically updating the model based on the specific temperature readings, sensor data, and operational data collected during the operation of the motor. Accordingly, the improvements in rotor resistance estimation and torque output accuracy described herein are applied differently to different induction motors, taking into account small motor-to-motor production differences and wear, and other installation and environmental differences that effect the thermal dynamics of individual motors.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A control system for an induction motor, comprising:
a plurality of sensors connectable to the induction motor, the plurality of sensors including a stator temperature sensor and one or more additional sensors;
one or more central processing units (CPUs) in communication with the plurality of sensors; and
memory storing executable instructions that, when executed by the one or more CPUs, cause the control system to perform operations comprising:
receiving sensor data from the one or more additional sensors during operation of the induction motor;
determining a predicted temperature of a stator of the induction motor based at least in part on the sensor data from the one or more additional sensors;
receiving an observed temperature of the stator from the stator temperature sensor;
determining a difference between the predicted temperature and the observed temperature of the stator;
determining a resistance of a rotor of the induction motor based at least in part on the difference between the predicted temperature and the observed temperature of the stator; and
controlling a torque output the induction motor based at least in part on the resistance of the rotor.

2. The control system of claim 1, wherein the sensor data received from the one or more additional sensors comprises at least one of:
a rotor speed;
an electrical frequency of the induction motor;
a DC link voltage of the induction motor;
an AC RMS line-to-line voltage of the induction motor;
an RMS phase current of the induction motor;
a switching pattern of the induction motor; and
an air flow rate of the induction motor.

3. The control system of claim 1, wherein determining the predicted temperature of the stator comprises executing a first equation of a model, wherein the first equation is an equation for estimating temperature based at least in part on a first loss energy of the stator, a second loss energy of the rotor, and an air flow of the induction motor.

4. The control system of claim 3, wherein determining the resistance of the rotor comprises executing a second equation of the model, wherein the second equation is an equation for estimating the resistance of the rotor based at least in part on the first loss energy of the stator, the second loss energy of the rotor, and the air flow of the induction motor.

5. The control system of claim 4, wherein determining the resistance of the rotor further comprises:
determining a first modification to the first equation, such that executing the first equation with the first modification produces an estimated temperature of the stator equal to the observed temperature of the stator;
determining a second modification to second first equation, wherein the second modification is based on the first modification; and
executing the second equation with the second modification, to estimate the resistance of the rotor.

6. The control system of claim 5, wherein the determining the first modification to the first equation comprises:
determining a difference between the predicted temperature and the observed temperature of the stator;

determining a first product by multiplying the difference times a first coefficient; and adding the first equation to the first product.

7. The control system of claim 6, wherein the determining the second modification to the second equation comprises:

determining a second product by multiplying the difference times a second coefficient; and adding the second equation to the second product.

8. The control system of claim 1, wherein determining the predicted temperature of the stator comprises:

determining a copper loss of the stator based at least in part on the sensor data;

determining an iron loss of the stator based at least in part on the sensor data; and determining an air flow rate of the induction motor.

9. The control system of claim 8, wherein determining the resistance of the rotor comprises:

determining a copper loss of the rotor based at least in part on the sensor data;

determining an iron loss of the rotor based at least in part on the sensor data; and determining an estimated temperature of the rotor based at least in part on the copper loss of the rotor, the iron loss of the rotor, and the air flow rate of the induction motor.

10. A method, comprising:

receiving, by a controller associated with an induction motor, sensor data from one or more sensors during operation of the induction motor;

determining, by the controller, a predicted temperature of a stator of the induction motor based at least in part on the sensor data from the one or more sensors;

receiving, by the controller, an observed temperature of the stator from a stator temperature sensor;

determining, by the controller, a difference between the predicted temperature and the observed temperature of the stator;

determining, by the controller, a resistance of a rotor of the induction motor based at least in part on the difference between the predicted temperature and the observed temperature of the stator; and controlling, by the controller, a torque output of the induction motor based at least in part on the resistance of the rotor.

11. The method of claim 10, wherein the sensor data received from the one or more sensors comprises at least one of:

a rotor speed;

an electrical frequency of the induction motor;

a DC link voltage of the induction motor;

an AC RMS line-to-line voltage of the induction motor;

an RMS phase current of the induction motor;

a switching pattern of the induction motor; and an air flow rate of the induction motor.

12. The method of claim 10, wherein determining the predicted temperature of the stator comprises executing a first equation of a model, wherein the first equation is an equation for estimating temperature based at least in part on a first loss energy of the stator, a second loss energy of the rotor, and an air flow of the induction motor.

13. The method of claim 12, wherein determining the resistance of the rotor comprises executing a second equation of the model, wherein the second equation is an equation for estimating the resistance of the rotor based at least in part on the first loss energy of the stator, the second loss energy of the rotor, and the air flow of the induction motor.

14. The method of claim 13, wherein determining the resistance of the rotor further comprises:

determining a first modification to the first equation, such that executing the first equation with the first modification produces an estimated stator temperature equal to the observed temperature of the stator;

determining a second modification to second first equation, wherein the second modification is based on the first modification; and executing the second equation with the second modification, to estimate the resistance of the rotor.

15. The method of claim 14, wherein the first modification to the first equation comprises summing the first equation with a first coefficient times the difference between the predicted temperature and the observed temperature of the stator, and the second modification to the second equation comprises summing the second equation with a second coefficient times the difference between the predicted temperature and the observed temperature of the stator.

16. The method of claim 10, wherein determining the predicted temperature of the stator comprises:

determining a copper loss of the stator based at least in part on the sensor data;

determining an iron loss of the stator based at least in part on the sensor data; and determining an air flow rate of the induction motor.

17. The method of claim 16, wherein determining the resistance of the rotor comprises:

determining a copper loss of the rotor based at least in part on the sensor data;

determining an iron loss of the rotor based at least in part on the sensor data; and determining an estimated temperature of the rotor based at least in part on the copper loss of the rotor, the iron loss of the rotor, and the air flow rate of the induction motor.

18. A system, comprising:

an induction motor, the induction motor including a stator component, a rotor component, a drive shaft coupled to the rotor component, and an AC power source;

a first sensor configured to determine a temperature of the stator component;

a second sensor configured to determine at least one additional operating parameter of the induction motor; and a controller operably connected to the induction motor, and in communication with the first sensor and the second sensor, the controller being configured to:

receive sensor data from the second sensor during operation of the induction motor;

determine a predicted temperature of the stator component based at least in part on the sensor data from the second sensor;

receive an observed temperature of the stator component from the first sensor;

determine a difference between the predicted temperature of the stator component and the observed temperature of the stator component;

determine a resistance of the rotor component based at least in part on the difference between the predicted temperature of the stator component and the observed temperature of the stator component; and control a torque output the induction motor based at least in part on the resistance of the rotor component.

19. The system of claim 18, wherein determining the predicted temperature of the stator component comprises executing a first equation of a model, wherein the first equation is an equation for estimating temperature based at least in part on a first loss energy of the stator component, a second loss energy of the rotor component, and an air flow of the induction motor; and wherein determining the resistance of the rotor component comprises executing a second equation of the model, wherein the second equation is an equation for estimating the resistance of the rotor component based at least in part on the first loss energy of the stator component, the second loss energy of the rotor component, and the air flow of the induction motor.

20. The system of claim 19, wherein determining the resistance of the rotor component further comprises:

determining a first modification to the first equation, such that executing the first equation with the first modification produces an estimated stator temperature equal to the observed temperature of the stator component;

determining a second modification to second first equation, wherein the second modification is based on the first modification; and executing the second equation with the second modification, to estimate the resistance of the rotor component.

* * * * *